United States Patent [19]

Tateno

[11] Patent Number: 5,242,330
[45] Date of Patent: Sep. 7, 1993

[54] VARIABLE SPEED PULLEY AND GEAR MECHANISM

[75] Inventor: Masao Tateno, Tochigi, Japan

[73] Assignee: Tochigifujisangyo Kabushiki Kaisha, Japan

[21] Appl. No.: 870,821

[22] Filed: Apr. 20, 1992

[30] Foreign Application Priority Data

Apr. 22, 1991 [JP] Japan ................. 3-27574[U]

[51] Int. Cl.$^5$ ............................................. F16H 55/52
[52] U.S. Cl. ................................................... 474/13
[58] Field of Search ............................ 474/8, 11–15, 474/69, 70

[56] References Cited

U.S. PATENT DOCUMENTS

| | | |
|---|---|---|
| 3,975,964 | 8/1976 | Adams . |
| 4,028,953 | 6/1977 | Lavallee ................. 474/13 |
| 4,102,214 | 7/1978 | Hoff ....................... 474/13 |
| 4,345,664 | 8/1982 | Anno et al. ........... 474/13 X |
| 4,384,862 | 5/1983 | Nakane ................... 474/13 |
| 4,515,575 | 5/1985 | Kinbara et al. ........ 474/13 |

FOREIGN PATENT DOCUMENTS

| | | |
|---|---|---|
| 58-180862 | 10/1983 | Japan . |
| 59-54849 | 3/1984 | Japan . |
| 62-145949 | 9/1987 | Japan . |

*Primary Examiner*—Thuy M. Bui
*Attorney, Agent, or Firm*—Graham & James

[57] ABSTRACT

A belt type nonstep variable speed pulley and gear mechanism conveys an engine rotational driving force towards an auxiliary machinery in a vehicle while changing engine speeds. It includes an axle, a fixed flange unitarily rotatable and fixedly mounted in an axial direction which extends along the axle, a movable flange unitarily rotatable with the axle and movable in the axial direction. The movable flange has one side face arranged against the fixed flange. The variable speed pulley device also has a belt provided between the fixed flange and the movable flange, a cam member having a predetermined cam face which is pressed by thrust force in the axle direction for moving the movable flange, a fixed member arranged against an other side face of the movable flange and unitarily rotatable with the axle, and a flyweight arranged between the fixed member and the movable flange so as to contact with and press the cam face by centrifugal force. The cam face has a face angle which is formed between the cam face and the axle so as to become gradually larger in a direction in which the centrifugal force works. The changing angle of the cam face satisfies properties of the auxiliary machinery which comprise high speed changing points and/or fixably maintained rotational frequencies.

4 Claims, 6 Drawing Sheets

VARIABLE SPEED PULLEY AND GEAR MECHANISM

BACKGROUND OF THE INVENTION b 1. Field of the Invention

The present invention relates to a variable speed pulley device which is provided between a vehicle engine and an auxiliary machinery and works as a part of a belt type nonstep variable speed gear mechanism which comprises a pair of variable speed pulley devices.

2. Description of the Prior Art

A variable speed pulley device has been disclosed in a Japanese Utility Model Application No. 62-145949. This application, "a drive mechanism of a mechanical type supercharger," discloses a drive mechanism in which a belt type nonstep variable speed gear mechanism is provided between an engine and a mechanical type supercharger (which corresponds to an auxiliary machinery). In this variable speed gear mechanism, a flange interval of a variable speed pulley device is changed according to engine speed changes by a cam which receives centrifugal force from a flyweight, whereby a pitch radius of a belt can be regulated. In this mechanism, rotational frequency changes of the supercharger may be controlled over a broad range of engine speeds (i.e. from a low-middle rotational frequency range to a high rotational frequency range).

Figure 1:
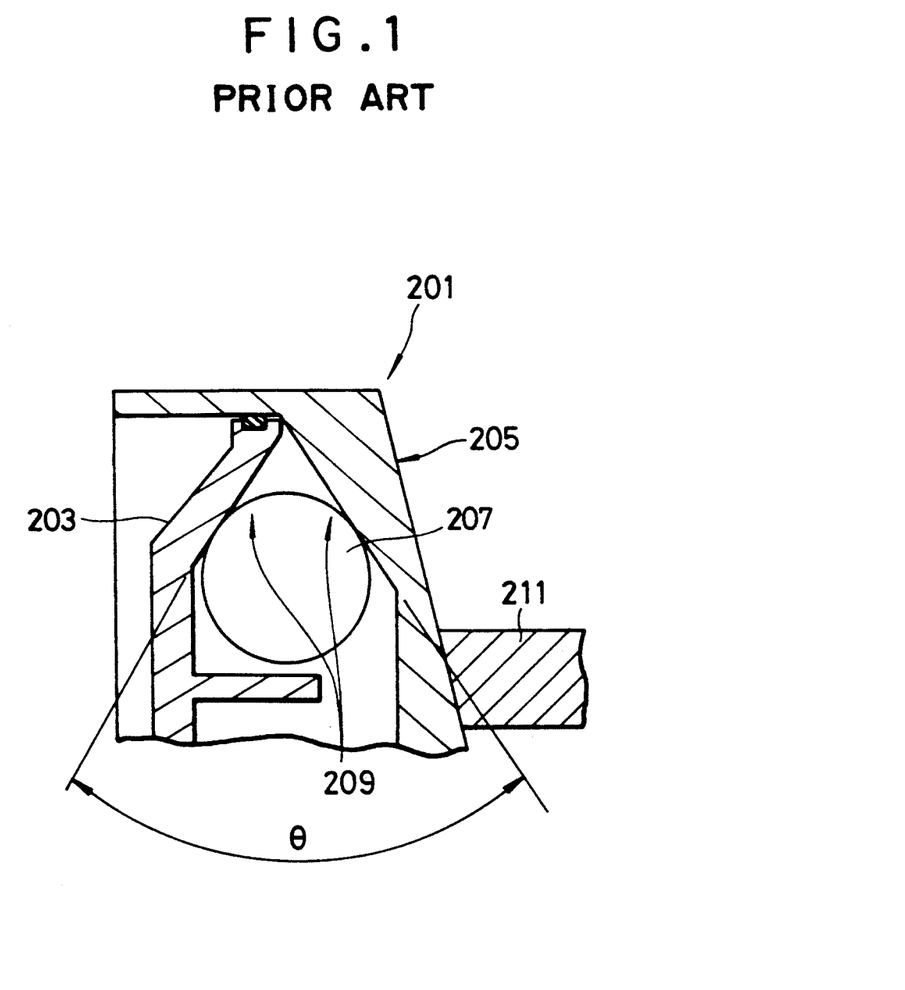
FIG. 1 is a cross-sectional view of a variable speed pulley device, according to a conventional example.

FIG. 1 illustrates a variable speed pulley device 201 corresponding to the above-mentioned variable speed pulley device. This variable speed pulley device is provided on the mechanical type supercharger side (i.e. auxiliary machinery side) in the belt type nonstep variable speed gear mechanism. The variable speed gear mechanism is provided between the vehicle engine and the mechanical type supercharger. Namely, the other variable speed pulley device is provided on the engine side. The variable speed pulley device employed in the mechanical type supercharger side comprises a pair of cams 209. One of the cams is formed between a fixed cam member 203 which is fixedly mounted on an axle (which is not shown in FIG. 1) and a flyweight 207. The other cam is formed between said flyweight 207 and a movable flange 205 which is fixedly mounted on said axle. The variable speed pulley device on the mechanical type supercharger side and the variable speed pulley device on the engine side (which is not shown in FIG. 1) are coupled by a belt 211. Tension is given to the belt 211 by a spring which is provided between flanges of the engine side variable speed pulley device (not shown).

In the above described art, when centrifugal force of the flyweight 207 is applied to the cams 209, the movable flange 205 moves against the belt tension toward a fixed flange which is not shown in FIG. 1 but would be located on the right hand side of FIG. 1. When the movable flange 205 moves in this way, belt pitch radii of both the engine side variable speed pulley device and the supercharger side variable speed pulley device become changed, causing changes in the supercharger side rotational frequency which is conveyed from the engine side. Namely, the nonstep variable speed gear mechanism is to minimize the rotational frequency changes when conveying the engine driving force to the supercharger even if the engine speed changes radically. That is, in this kind of variable speed gear mechanism, it is required that engine driving force be reduced in accordance with a demanded property of an auxiliary machinery such as a supercharger.

With regard to the variable speed pulley device in the above-described prior art, the surfaces of the cams are flat. Namely, an angle which is made between faces of each cam is invariable. This angle will be shown and described as a cam angle $\theta$ hereinafter.

Figure 2:
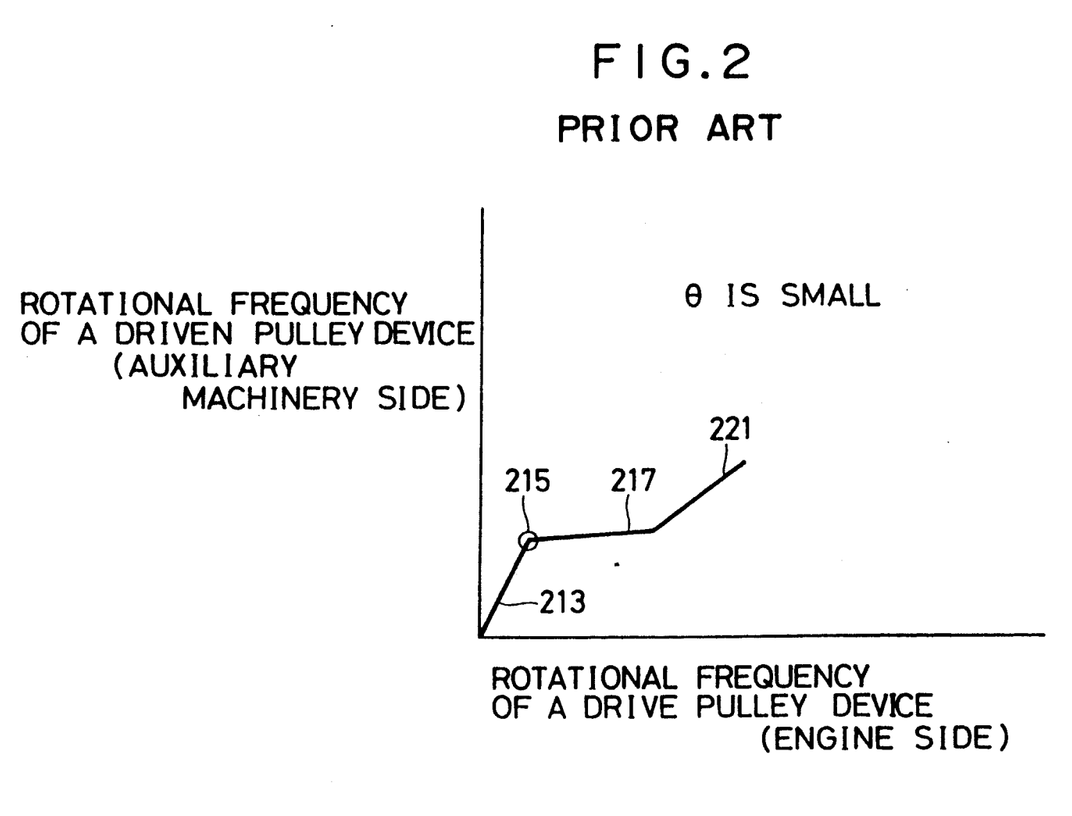
FIG. 2 is a line graph showing a relationship between rotational frequencies in a drive pulley device and rotational frequencies in the driven pulley device illustrated in FIG. 1, according to the conventional example.

FIG. 2 is a line graph describing a relationship between rotational frequencies in the drive pulley device (i.e. on the engine side) and rotational frequencies in the driven pulley device (i.e. on the auxiliary machinery side) in a case which a small cam angle $\theta$ is predetermined. When the engine device increases, the rotational frequency of the driven pulley side becomes substantially increased as shown by slope 213. A large thrust force is created in the cam 209 due to the small cam angle $\theta$. After a while, a speed changing point 215 appears in a low rotational frequency range where the thrust force is balanced with the belt tension. As the engine speed increases further, the movable flange 205 starts to move, whereby the engine speed is conveyed toward the auxiliary machinery while the engine speed is reduced. In this situation, the rotational frequency of the auxiliary machinery is almost fixedly maintained within a low rotational frequency range as shown by slope 217. As the engine speed increases even more, the movable flange 205 reaches its moving limit, whereby a speed reducing function of the variable speed gear mechanism stops and the rotational frequency of the driven pulley device starts to increase again as shown by slope 221.

As described above, when a small cam angle $\theta$ is predetermined, the rotational frequencies in the auxiliary machinery at and after the speed changing point are not high enough for the supercharger. Also, a high frequency range for the supercharger appears after a certain period of the low rotational frequency range thereof, wherein rotational frequencies of the driven pulley device substantially increase once again according to the rotational frequencies of the drive pulley device. Namely, after the low rotational frequency range is passed, the variable speed gear mechanism can no longer keep up with the high engine speed.

The above-described problems may be improved by strengthening the belt tension. However, in this situation there is a limit to how much the belt tension can be strengthened because rotational resistance caused by friction between the belt and a pulley may be increased resulting in a shorter life span for the belt.

Figure 3:
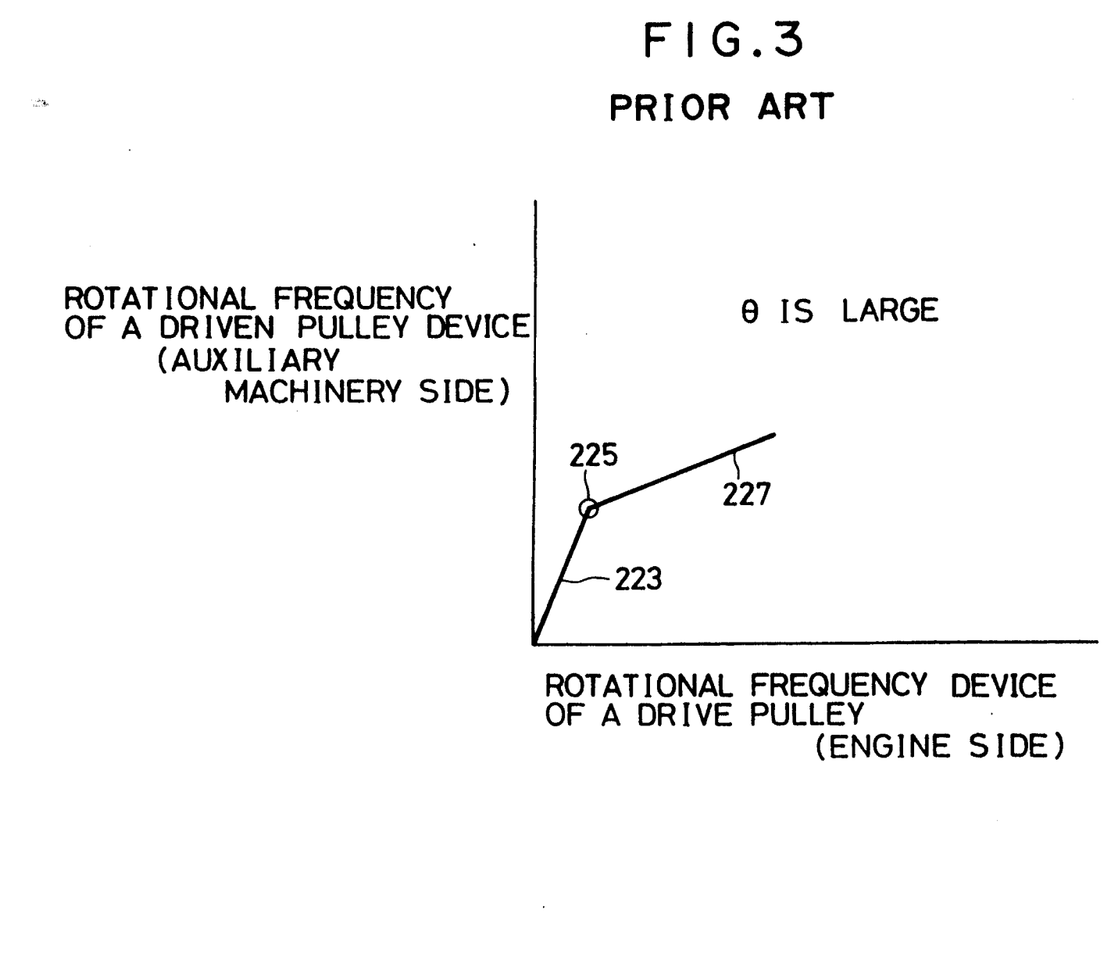
FIG. 3 is a line graph showing a relationship between rotational frequencies in a drive pulley device and rotational frequencies in the driven pulley device illustrated in FIG. 1, according to the conventional example.

On the other hand, a predetermined big cam angle $\theta$ causes the thrust force of the cam 209 t be reduced, whereby a speed changing point 225 reaches to a high level a shown by slope 223 in FIG. 3. However, the rotational frequencies in the supercharger side remain at increased levels when the speed range is reduced, due to the small size of the thrust force, as shown by slope 227. Thus, a big cam angle $\theta$ also cannot fixedly maintain the rotational frequency in the supercharger side.

As described above, it is very difficult for the prior variable speed gear mechanism using the prior variable speed pulley device to satisfy necessary properties for use with auxiliary machineries, for example, high speed changing points and/or fixedly maintained rotational frequencies in the auxiliary machinery side.

SUMMARY OF THE INVENTION

In view of the above, an object of the present invention is to solve the aforementioned problems in the prior art through the introduction of a variable speed pulley device by which properties required for use with auxiliary machinery, for example, high speed changing points and/or fixedly maintained rotational frequencies in an auxiliary machinery side, can be accomplished in a belt type nonstep variable speed gear mechanism in order to drive a vehicle auxiliary machinery.

The aforesaid object of the present invention is accomplished through a variable speed pulley device which works as a part of a belt type nonstep variable speed gear mechanism which conveys an engine rotational driving force toward an auxiliary machinery in a vehicle while changing engine speeds, said variable speed pulley device comprising:

an axle;

a fixed flange unitarily rotatable with said axle and fixedly mounted in an axle direction which extends along said axle;

a movable flange unitarily rotatable with said axle, movable in said axle direction, and having one side face arranged against said fixed flange;

a belt provided between said fixed flange and said movable flange;

cam means having a predetermined cam face which is pressed by thrust force in said axle direction for moving said movable flange;

a fixed member arranged against an other side face of said movable flange and unitarily rotatable with said axle; and a flyweight arranged between said fixed member and said movable flange so as to contact with and press said cam face by centrifugal force;

said cam face, having a face angle changeable in a direction in which said centrifugal force applies, to satisfy a required property for the auxiliary machinery.

In a preferred embodiment of a variable speed pulley device according to the present invention, said cam face of said cam means is unitarily formed with said movable flange and/or said fixed member.

In a preferred embodiment of the variable speed pulley device with respect to the required properties for a supercharger or the like, said face angle of said cam face is changed so that inside angles formed between said cam face and said axle become gradually larger in a direction in which the centrifugal force works.

In order to satisfy the required properties of an auxiliary machinery, a cam angle which is formed between faces of each cam is changed. Because a cam angle becomes gradually larger, when an engine is in a low engine speed range, a cam is positioned in a way in which a large cam angle is formed so s to create a smaller thrust force. In this manner, the reduction of rotational frequencies is executed by conveying a rotational driving force from an engine by a small thrust force. Therefore, a rotational frequency at a speed changing point in which belt tension is balanced with said thrust force increases. After the engine speed increases further and passes the speed changing point, the cam is positioned in a way in which a small cam angle is formed so as to create a big thrust force. In this manner, rotational frequencies in the auxiliary machinery side are almost fixedly maintained.

DETAILED DESCRIPTION OF THE PREFERRED EMBODIMENTS

Figure 5:
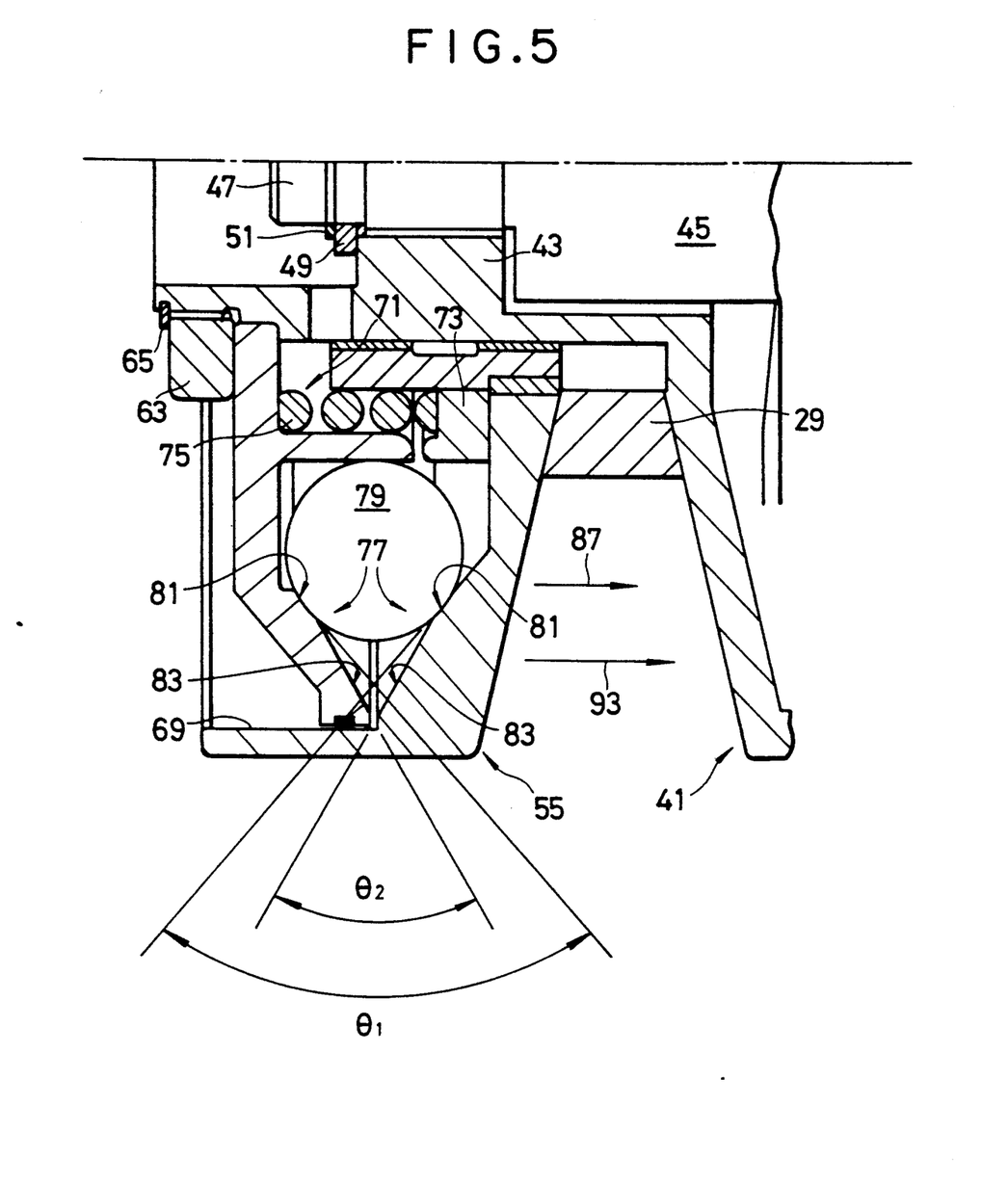
FIG. 5 is a fragmentary enlarged cross-sectional view showing the variable speed pulley device illustrated in FIG. 4.
Figure 6:
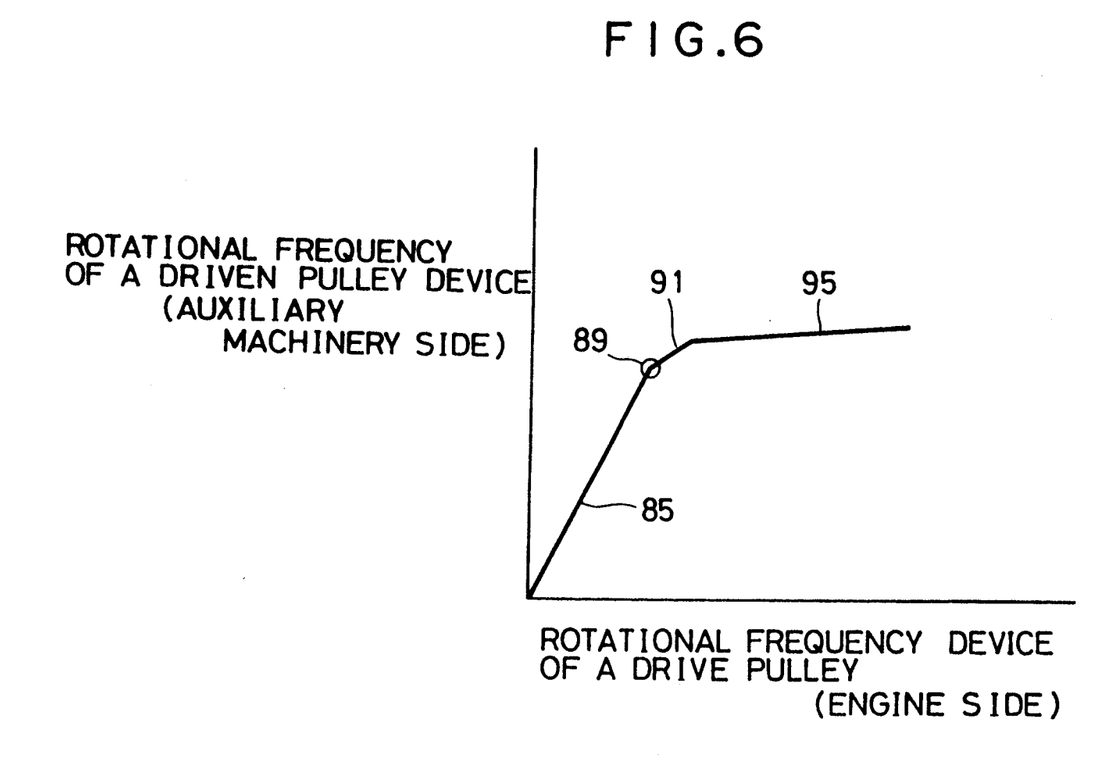
FIG. 6 is a line graph showing a relationship between rotational frequencies in the drive pulley device and rotational frequencies in the driven pulley device illustrated in FIG. 4, according to the present invention.

An embodiment according to the present invention will be described hereinafter using FIGS. 4-6.

Figure 4:
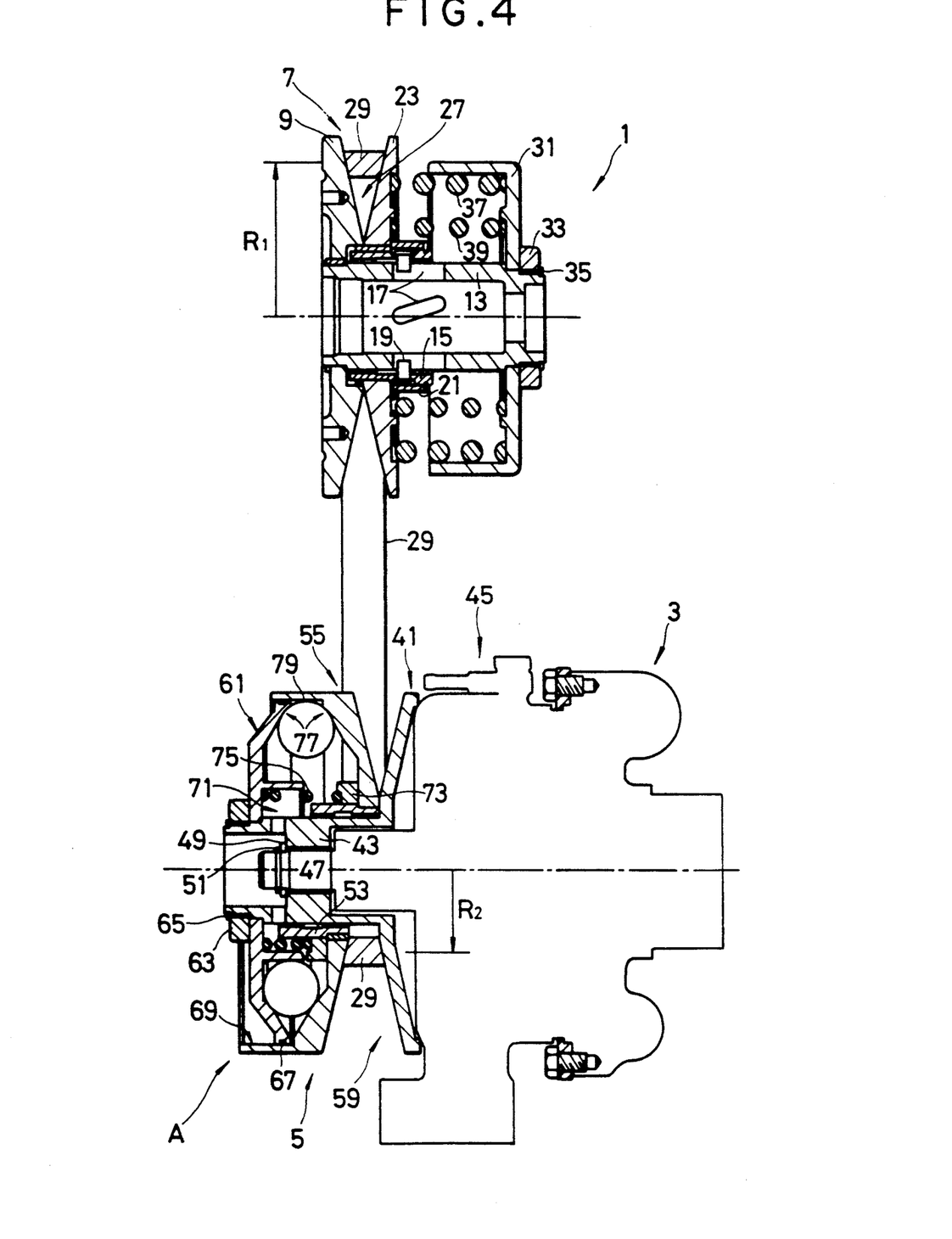
FIG. 4 is a cross-sectional view showing a variable speed gear mechanism including a variable speed pulley device according to the present invention.

FIG. 4 illustrates a belt type nonstep variable speed gear mechanism. The embodiment of a variable speed pulley device according to the present invention is employed in the side of a mechanical type supercharger which is driven by an engine using the variable speed gear mechanism. Namely, the embodiment of the present invention is shown by a driven pulley device 5. Any members or parts or devices which do not have any reference characters are not illustrated in FIGS. 4 and 5.

First, a drive pulley device 7 (according to a conventional example) in the engine side will be explained.

A fixed flange 9 in the drive pulley device 7 is fixedly mounted on a hollow axle 13 as shown in FIG. 4. This hollow axle 13 is connected to the engine and driven by a rotational driving force thereof.

A hub 15 is provided on an outer periphery of the hollow axle 13. The hub 15 is movable along the hollow axle 13 (i.e. in the axle direction in which the axis of the hollow axle 13 extends) by means of pins 19 which are fitted in cam slots 17 provided on the hollow axle 13. Further, the hub 15 is unitarily rotatable with the hollow axle 13. A collar 21 is provided on the hollow axle 15 so that the pins 19 are prevented from slipping off due to centrifugal force.

A movable flange 23 is fixedly mounted on the hub 15. A belt channel 27 is formed between the movable flange 23 and the fixed flange 9. As the movable flange 23 moves along the hollow axle 13 in said axle direction with the hub 15, the width of the belt channel 27 changes, thereby changing the pitch radius $R_1$.

A retainer 31 is provided on the hollow axle 13, and a nut 33 and a locating snap ring 35 are provided on the side of said retainer 31 so that the retainer 31 can be prevented from slipping off. Springs 37, 39 each having a winding radius are provided between the retainer 31 and the movable flange 23 in order to bias the movable flange 23 in a direction in which the pitch radius $R_1$ can become large.

Next, the supercharger 3 and the driven pulley device 5 in which the present invention is employed will be explained.

A fixed flange 41 in the driven pulley device 5 is unitarily formed with a hollow axle 43. This hollow axle 43 is connected to an input axle 47 of a speed increasing gear mechanism 45 and prevented from slipping off by a washer 49 and a locating snap ring 51.

The speed increasing gear mechanism 45 increases the input rotational speed in the input axle 47 and supercharges the engine while using a centrifugal compressor and driving the supercharger 3 high-speedily.

A hub 53 is spline connected to the outer periphery of the hollow axle 43 in a condition in which the hub 53 is movable in the axle direction. A movable flange 55 is fixedly mounted on the outer periphery of the hub 53. A belt channel 59 is formed between the movable flange 55 and the fixed flange 41. The belt 29 is arranged on the belt channel 59, connecting the drive pulley device 7 and the driven pulley device 5. While the movable flange 55 moves in the axle direction with hub 53, a width of the belt channel 59 changes, thereby changing a pitch radius $R_2$ of the belt 29.

A cam member 61 is mounted on the hollow axle 43 so as to be unitarily movable with the hollow axles 43 and prevented from slipping off by a nut 63 and a locating snap ring 65. The outer periphery of the cam member 61 slidingly contacts with an inner periphery of a cylindrical portion of the movable flange 55 in a fluid-tight condition. A spring 75 is arranged between a retainer part 71 of the cam member 61 and a retainer member 73 is the movable flange 55 side in order to bias the movable flange 55 toward a direction in which the pitch radius $R_2$ can become large.

Namely, the springs 37, 39 located in the drive pulley device 7 side and the spring 75 located in the driven pulley 5 side are employed in order to make each pitch radius $R_1$, $R_2$ bigger, giving tension to the belt 29. Because the biasing force of the springs 37, 39 is bigger than that one of the spring 75, if any other forces are not applied, the pitch radius $R_1$ of the drive pulley device 7 remains at its maximum, and the pitch radius $R_2$ of the driven pulley device 5 remains its minimum as shown by the lower part of the driven pulley device 5 in FIG. 1, thereby causing the maximum speed changing rate (i.e. a speed increasing condition).

A pair of cams 77 are provided between the cam member 61 and the movable flange 55, and a flyweight (a steel ball) is provided between the pair of cams 77 so as to press the cams 77 with centrifugal force.

The cams 77 have cam faces 81, 83. These cam faces 81, 83 are formed in the movable flange 55 and the cam member 61, respectively. The face angles of the cam faces are changed with respect to the axis of the hollow axle 43 in a direction in which the centrifugal force works. A cam angle $\theta_1$ which is formed between the cam faces 81 is predetermined to be bigger than a cam angle $\theta_2$ which is formed between the cam faces 83. Namely, the cam faces 81 and the cam faces 83 change their face angles, respectively, so that inside angles formed between the cam faces 81, 83 and the axis of the hollow axle 43 become gradually large in a direction in which the centrifugal force works.

As described above, the nonstep variable speed gear mechanism 1 is constructed, and a speed changing function thereof will be explained hereinafter. FIG. 6 is a line graph which describes the rotational frequency changes in the driven pulley device 5 with respect to the rotational frequency changes in the drive pulley device 7, from the engine starting period to the next period in which the engine speed (the rotational frequency of the drive pulley device 7) increases and reaches its high engine speed range.

While the rotational frequency of the drive pulley device 7 is still low after the engine starts and the thrust of the cam 77 is small because the centrifugal force of the flyweight 79 is not big enough, the pitch radius $R_1$ of the drive pulley device 7 remains in its minimum state. Therefore, the rotational frequency of the driven pulley device 5 increases in accordance with the rotational frequency increase of the drive pulley device 7.

When the centrifugal force of the flyweight 79 increases due to further increase of the engine speed, the sum total of both the thrust force 87 occurring in the cam face 81 and the biasing force of the spring 75 are balanced with the belt tension which is in an opposite direction to that of the thrust force 87, whereby the rotational frequency in the driven pulley device 5 is brought to a speed changing point 89.

As the engine speed increases further, the movable flange 55 moves due to the thrust force 87, whereby the pitch radius $R_2$ of the drive pulley 7 becomes small. These actions cause changes in the speed changing ratios. In this manner, a reduction of the speed in which the engine speed conveys its rotational driving force towards the supercharger 3 is executed as shown by a slope 91 in FIG. 6.

As the engine speed increases further, a pair of contact points between the flyweight 79 and the cams 77 move from the cam faces 81 toward the cam faces 83 which form the small cam angle $\theta_2$ which is smaller the cam angle $\eta_1$. The small can angle $\theta_2$ causes the big thrust force 93 in the cams 77. In this manner, the movable flange 55 moves substantially, causing large speed reduction ratios, as shown by the upper part of the driven pulley device 5 in FIG. 4. Therefore, even though the rotational frequency in the drive pulley device 7 substantially increases, the rotational frequency in the driven pulley device 5 is fixedly maintained, whereby a stable speed condition is reached as shown by a slope 95.

As described above, because the big can angle $\theta_1$ is predetermined for the low rotational frequency range and the small cam angle $\theta_2$ is predetermined for the high rotational frequency range, a high speed changing point is accomplished along with high rotational frequencies in said stable speed condition. In this manner, it is not necessary for the belt 29 to be given high tension. Therefore, the life span of the belt 29 should not be shortened due to increases in its rotational resistance.

In connection with the above, a pair of cam faces can be shaped into curves rather than flat faces.

Further, a variable speed pulley device according to the present invention may be employed for a drive pulley device. In this situation, it is necessary for cams to be formed into a shape in which the belt pith radius in the drive pulley device side can become gradually large due to the thrust force occurring therein.

Further, in connection with the above an auxiliary machinery may be an oil hydraulic pump or an alternator.

What is claimed is:

1. A variable speed pulley device which works as a part of a belt type nonstep variable speed gear mechanism which conveys an engine rotational driving force toward an auxiliary machinery in a vehicle while changing engine speeds, said variable speed pulley device comprising:

an axle;

a fixed flange rotatable with said axle and fixedly mounted in an axial direction which extends along said axle;

a movable flange rotatable with said axle, movable in said axial direction, and having one side face arranged to face said fixed flange;

a belt provided between said fixed flange and said movable flange;

cam means having a pair of cam faces which are pressed by thrust force in said axial direction for moving said movable flange;

a fixed member arranged against an other side face of said movable flange and rotatable with said axle; and a flyweight arranged between said fixed member and said movable flange so as to contact with and press said cam face by centrifugal force;

wherein each of said cam faces includes a plurality of angles surfaces which are formed so that inside angles formed between each of said cam faces and said axle become larger in a direction in which the centrifugal force works.

2. A variable speed pulley device according to claim 1, wherein at least one of said cam faces of said cam means is integrally formed with said movable flange and/or said fixed member.

3. A belt type nonstep variable speed gear mechanism which conveys an engine rotational driving force connected with a drive pulley device toward an auxiliary machinery connected with a driven pulley device in a vehicle while changing gears, said drive pulley device and said driven pulley device being coupled by a belt, said variable speed gear mechanism comprising:

a driving axle, a first fixed flange rotatable with said driving axle and fixedly mounted in a first axial direction which extends along said driving axle, a first movable flange rotatable with said driving axle, movable in said first axial direction, and having one side face arranged to face said first fixed flange, a first biasing member provided so as to bias said first movable flange in a direction in which a first pitch radius of said belt in the drive pulley device becomes large, a driven axle, a second fixed flange rotatable with said driven axle and fixedly mounted in a second axial direction which extends along said driven axle, a second movable flange rotatable with said driven axle and movable in said second axial direction, one side face of said second movable flange being arranged to face said second fixed flange, cam means having a predetermined cam face pressed by thrust force in said second axial direction for moving said second movable flange, a fixed member arranged against another side face of said second movable flange and rotatable with said driven axle, a flyweight arranged between said fixed member and said second movable flange so as to contact with and press said cam face by centrifugal force, and a second biasing member provided so as to bias said second movable flange in a direction in which a second pitch radius of said belt in the driven pulley device increases and in which said second movable flange moves when the centrifugal force acts on said flyweight, said first biasing member having a greater biasing force than that of said second biasing member, wherein said belt is provided between said second fixed flange and said second movable flange in said driven pulley device, said cam face having a changing face angle, such that inside angles formed between said cam face and said second axle become gradually larger in a direction in which the centrifugal force works, thereby increasing a speed changing point and maintaining rotational frequencies in the auxiliary machinery after the speed changing point.

4. A variable speed gear mechanism according to claim 3, wherein said cam face of said cam means is formed integrally with said second movable flange and/or said fixed member.

* * * * *